(12) United States Patent
Bencivenni et al.

(10) Patent No.: US 8,770,204 B2
(45) Date of Patent: Jul. 8, 2014

(54) SYSTEM FOR MONITORING AND CONTROLLING MACHINES USED IN THE MANUFACTURE OF TOBACCO PRODUCTS

(75) Inventors: Marco Bencivenni, Bologna (IT); Eura Trevisonno, Castelmaggiore (IT); Luca Cerati, Bologna (IT)

(73) Assignee: G.D S.p.A. (IT)

( * ) Notice: Subject to any disclaimer, the term of this patent is extended or adjusted under 35 U.S.C. 154(b) by 2030 days.

(21) Appl. No.: 10/579,725

(22) PCT Filed: Nov. 11, 2004

(86) PCT No.: PCT/IB2004/003766
§ 371 (c)(1),
(2), (4) Date: May 17, 2006

(87) PCT Pub. No.: WO2005/046365
PCT Pub. Date: May 26, 2005

(65) Prior Publication Data
US 2007/0144542 A1 Jun. 28, 2007

(30) Foreign Application Priority Data

Nov. 17, 2003 (IT) .............................. BO2003A0684

(51) Int. Cl.
*A24C 5/10* (2006.01)

(52) U.S. Cl.
USPC ............... 131/58; 131/282; 131/280; 131/94; 493/4; 493/37; 198/438; 73/863.91; 73/863.92

(58) Field of Classification Search
None
See application file for complete search history.

(56) References Cited

U.S. PATENT DOCUMENTS

| | | |
|---|---|---|
| 3,741,846 A | 6/1973 | Greve |
| 3,946,212 A | 3/1976 | Nakao et al. |
| 4,363,235 A | 12/1982 | Vulliens et al. |
| 5,044,379 A | 9/1991 | Cahill et al. |
| 5,116,298 A | 5/1992 | Bondanelli et al. |
| 5,209,249 A | 5/1993 | Neri |

(Continued)

FOREIGN PATENT DOCUMENTS

| | | |
|---|---|---|
| DE | 2017360 | 10/1971 |
| DE | 3917606 | 12/1989 |

(Continued)

OTHER PUBLICATIONS

Hauni, Koerber Gruppe, Tobacco Engineer, Flawless Filters, pp. 40-41, 1994.

(Continued)

*Primary Examiner* — Richard Crispino
*Assistant Examiner* — Phu Nguyen
(74) *Attorney, Agent, or Firm* — Timothy J. Klima; Shuttleworth & Ingersoll, PLC

(57) ABSTRACT

Tobacco products (2), typically cigarettes, are manufactured on a line (1) including a cigarette maker (3) and a filter tip attachment machine (4), both equipped with a number of production devices and units connected to respective master control units (82, 83) and visual display units (84). Key characteristics of sample tobacco products (2) are tested by an auxiliary inspection unit (45) forming part of a monitoring and control system associated with the manufacturing line (1), and connected up to a common interface network (48) so that signals reflecting the monitored characteristics can be fed back to a number of control units (81) associated respectively with the devices and the units of the line (1) on which the characteristics in question depend, and programmed to pilot corrective actions in response to the feedback signal.

23 Claims, 6 Drawing Sheets

(56) References Cited

U.S. PATENT DOCUMENTS

| | | | |
|---|---|---|---|
| 5,284,164 | A | 2/1994 | Andrews et al. |
| 5,695,070 | A | 12/1997 | Draghetti |
| 6,516,811 | B1 | 2/2003 | Focke et al. |
| 6,629,397 | B1 | 10/2003 | Focke et al. |
| 6,681,918 | B2 | 1/2004 | Wahle |
| 6,813,961 | B2 | 11/2004 | Stiller et al. |
| 7,684,889 | B2 | 3/2010 | Focke et al. |
| 2001/0049568 | A1 | 12/2001 | Focke et al. |
| 2002/0056463 | A1 | 5/2002 | Henning |
| 2004/0015383 | A1 | 1/2004 | Rathjen et al. |

FOREIGN PATENT DOCUMENTS

| | | |
|---|---|---|
| DE | 3917606 A1 | 12/1989 |
| DE | 3925073 | 2/1990 |
| DE | 19914297 | 10/2000 |
| DE | 19925968 | 12/2000 |
| DE | 10046133 | 3/2002 |
| DE | 10117082 | 10/2002 |
| DE | 10209753 | 9/2003 |
| EP | 0409443 | 1/1991 |
| EP | 0500302 | 8/1992 |
| EP | 0500302 A2 | 8/1992 |
| EP | 1197431 | 4/2002 |
| EP | 1346651 | 9/2003 |
| GB | 2220342 A | 1/1990 |
| JP | 2000037181 | 8/2000 |
| JP | 2001525586 | 12/2001 |
| WO | 0016647 | 3/2000 |

OTHER PUBLICATIONS

Ernst Voges, Tobacco Encyclopedia, pp. 5, 424 and 425, 1984.
Office Action issued by the Chinese Patent Office on Oct. 24, 2008 concerning parallel Chinese Patent Application No. 200480033598.9.
Office Action issued by the Japanese Patent Office on May 11, 2010 concerning parallel Japanese Patent Application No. 2006-538990.
Electrical Table Book, published by Europe Teaching Tool, 18 Edition, 2001, pp. 124-127, 138, 139, 182-185, 188, 189.
Walter Jakoby, Automation Technology, Springer 1996.
Hauni, E is for Efficiency . . . (date unknown).
M.D. Austin, Automatic Calibration, Automatic Calibration of Q.C. Instrumentation, Coresta Vienna, Sep. 1995.
Tobacco Engineer, Nov. 1985, published by International Koeber Group of Companies.
Christopher R. Crawley, Closing the Loop, Tobacco Reporter, Oct. 1989, vol. 116 No. 10.
Eastman IFMAC System Advances Filter Technology, Filter Facts, Apr. 1986, published by Eastman Chemical Products, Inc., Kingsport, Tennessee.
Minutes of oral proceedings dated Oct. 17, 2013 for Appeal No. T0576/11—3.2.04 regarding European patent No. EP1694145.
Decision dated Jan. 18, 2011 rejecting opposition against European patent No. EP1694145.
Grounds of Appeal dated May 13, 2011 regarding opposition against European patent No. EP 1694145, Opposition No. T0576/11-3204.
Supplemental submission dated Sep. 6, 2013 regarding European patent No. EP 1694145, Opposition No. T0576/11-32.
Reply dated Mar. 23, 2012 regarding opposition against European patent No. EP 1694145, Opposition No. T0576/11-32.

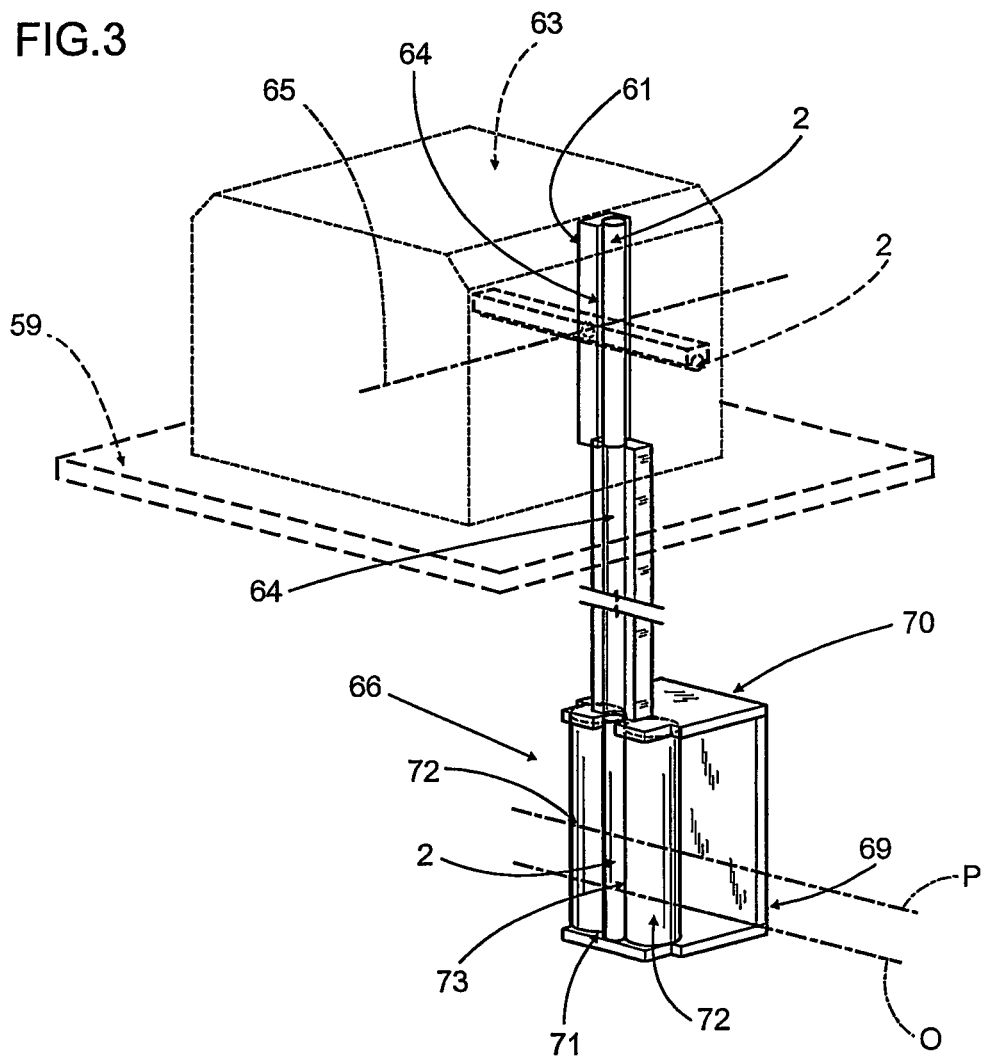
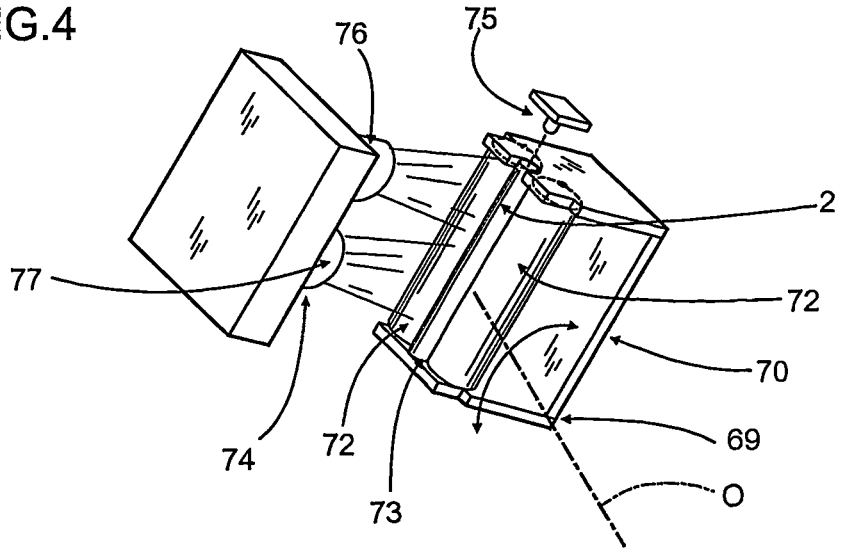

SYSTEM FOR MONITORING AND CONTROLLING MACHINES USED IN THE MANUFACTURE OF TOBACCO PRODUCTS

This application is the National Phase of International Application PCT/II32004/003766 filed 11 Nov. 2004 which designated the U.S. and that International Application was published under PCT Article 21(2) in English.

TECHNICAL FIELD

The present invention relates to a system for monitoring and controlling machines used in the manufacture of tobacco products.

BACKGROUND ART

Advantageously, the invention finds application in complete lines of equipment for the manufacture of tobacco products, and in particular cigarettes, comprising not only cigarette making machines but also filter tip attachment machines operating in combination with the cigarette makers.

The invention is concerned in particular with the quality control of cigarettes taken from the machines in question during the course of the production cycle, and in particular of cigarettes taken from the outfeed end of the line, that is to say, finished cigarettes complete with filter tip and print.

The task of quality-testing sample cigarettes taken from key points along the line is entrusted currently to a skilled operator who, at given regular intervals of time during the production cycle, will take a single sample and present it manually to a testing station in which certain characteristics of the cigarette are verified both by hand and with instruments, for example the quality of the outer surface and the print, the correct alignment of the tipping paper, and so forth.

Thereafter, the operator will make adjustments to the cigarette maker or the filter tip attachment machine so as to correct the operating parameters and remove the causes of any defects that may be observed in the sample cigarette.

It will be clear enough from the foregoing that this method of operation, which involves the use of skilled labour both for testing the characteristics of the cigarettes and for making adjustments to the machines, is particularly costly and unreliable, also that response times in respect of the testing procedure are somewhat lengthy.

In-line quality checks, on the other hand, and in particular those involving an optical inspection of the outer surface presented by the cigarettes, tend not to be very trustworthy by reason of the high speeds at which machines of the type in question typically operate.

The object of the present invention is to provide a system for monitoring and controlling machines used in the manufacture of tobacco products, in particular cigarettes, such as will be unaffected by the aforementioned drawbacks attributable both to testing systems relying on manual input, and to checks performed along the production line.

DISCLOSURE OF THE INVENTION

The stated object is duly realized in a system for monitoring and controlling machines used in the manufacture of tobacco products, as characterized in any one or more of the appended claims.

The invention will now be described in detail, by way of example, with the aid of the accompanying drawings, in which:

FIGS. 3 and 4 are portions of the detail shown in FIG. 2, illustrated schematically and viewed in perspective;

Figure 1:
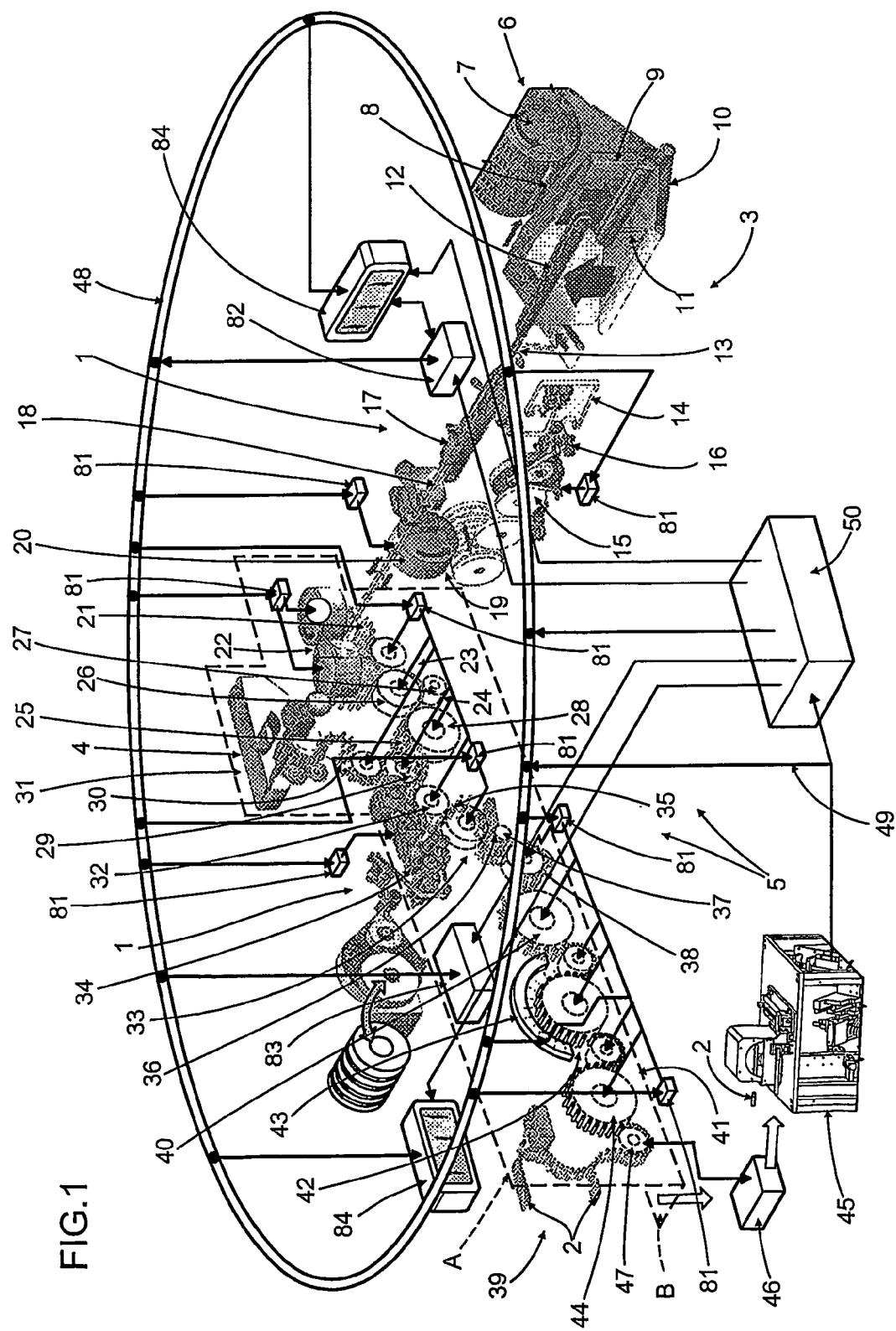
FIG. 1 illustrates the layout of a monitoring and control system associated with a cigarette making line, viewed in perspective.

Referring to FIG. 1 of the drawings, 1 denotes a line for manufacturing tobacco products, such as cigarettes 2, comprising a cigarette maker 3 and a filter tip attachment machine 4, each equipped with a plurality of production devices and units to be described hereinafter.

Associated with the line 1 is a monitoring and control system denoted 5 in its entirety, of which more will be said in due course.

The cigarette maker 3 includes a plurality of the aforementioned production devices and units, and more precisely, proceeding upstream to downstream, a carding unit 6 supplied from a feed hopper (not indicated) with tobacco, which is taken up by a carding roller 7 operating in conjunction with an impeller roller 8, and directed into a descent channel or chute 9, passing thence by way of a belt conveyor 10 to an ascent channel or riser 11.

The top end of the riser 11 is enclosed by an aspirating belt 12 on which particles of tobacco are caused to form gradually into a continuous stream 13 providing a filler for the cigarettes 2.

The stream 13 of tobacco is advanced together with a continuous strip 14 of paper decoiling from a roll 15, following a path along which a printer device 16 is stationed, and passes onto a forming beam 17 along which the paper strip 14 is wrapped around the stream 13 to form a continuous cigarette rod 18.

The rod 18 advances toward a cutting station 19 where it is divided up by a rotary cutter device 20 into cigarette sticks 21 of predetermined constant length, and more exactly of length twice the length of a stick equivalent to a single cigarette 2.

22 denotes a transfer device by which the double length cigarette sticks 21 are directed through an infeed roller stage 23 of the filter tip attachment machine 4 and into a cutting station 24 where each is divided into single cigarette sticks 25 by the action of a roller 26 and a disc cutter 27.

The single sticks 25 are transferred from the roller 26 of the cutting station, by way of a distancing roller 28 that serves to separate each pair of sticks 25 axially one from another, to an assembly roller 29 where a double length filter plug 30 is placed between the two sticks 25 of each successive pair, the filter plugs being dispensed from a feed unit denoted 31 in its entirety.

The resulting assemblies, each composed of two single cigarette sticks 25 and a double length filter plug 30 interposed axially between them, are released by the assembly roller 29 to a roller 32 forming part of a finishing unit 33, which also includes a unit 34 serving to cut and feed single tipping papers 35, and a rolling unit 36 by which the stick and filter plug assemblies 14 and the tipping papers 35 are received in succession and in such a way that each paper 35 can be rolled around a corresponding assembly to form a cigarette 2 of double length.

The double length cigarettes 2 are directed by way of an intermediate roller 37 toward a cutter device 38, and divided each in turn by a stroke made through the double length filter plug 11 in such a way as to generate two successions of single filter cigarettes 2 identical one to the other.

The two successions of filter cigarettes 2 are directed toward an outfeed unit 39 of the filter tip attachment machine 4, advancing first onto an overturning roller 40 by which the two successions are united to establish a single succession of cigarettes 2, then proceeding along a final train of rollers denoted 41 in its entirety, following a path along which the cigarettes 2 will undergo further processing steps of a familiar nature.

As illustrated for example in FIG. 1, the final train 41 of rollers, carried together with the aforementioned rollers 23, 26, 28, 29 and 32 by a vertical bulkhead A surmounting the frame B of the filter tip attachment machine 4, could include a roller 42 on which the cigarettes 2 are perforated by a laser device 43, and an inspection roller 44.

Still referring to FIG. 1, the monitoring and control system 5 comprises an auxiliary cigarette inspection unit 45 connected on an infeed side, by way of a cigarette sampling device represented as a block denoted 46, to a roller 47 operating at the outfeed 39 of the filter tip attachment machine 4.

The auxiliary inspection unit 45 is connected on the output side to a common interface network 48, both directly, by way of a link denoted 49, and indirectly by way of a respective signal processing and routing unit represented as a block denoted 50.

The network 48 is connected in turn to each of the electrical systems typically controlling the single production devices and units making up the manufacturing line 1 as described above.

Figure 2:
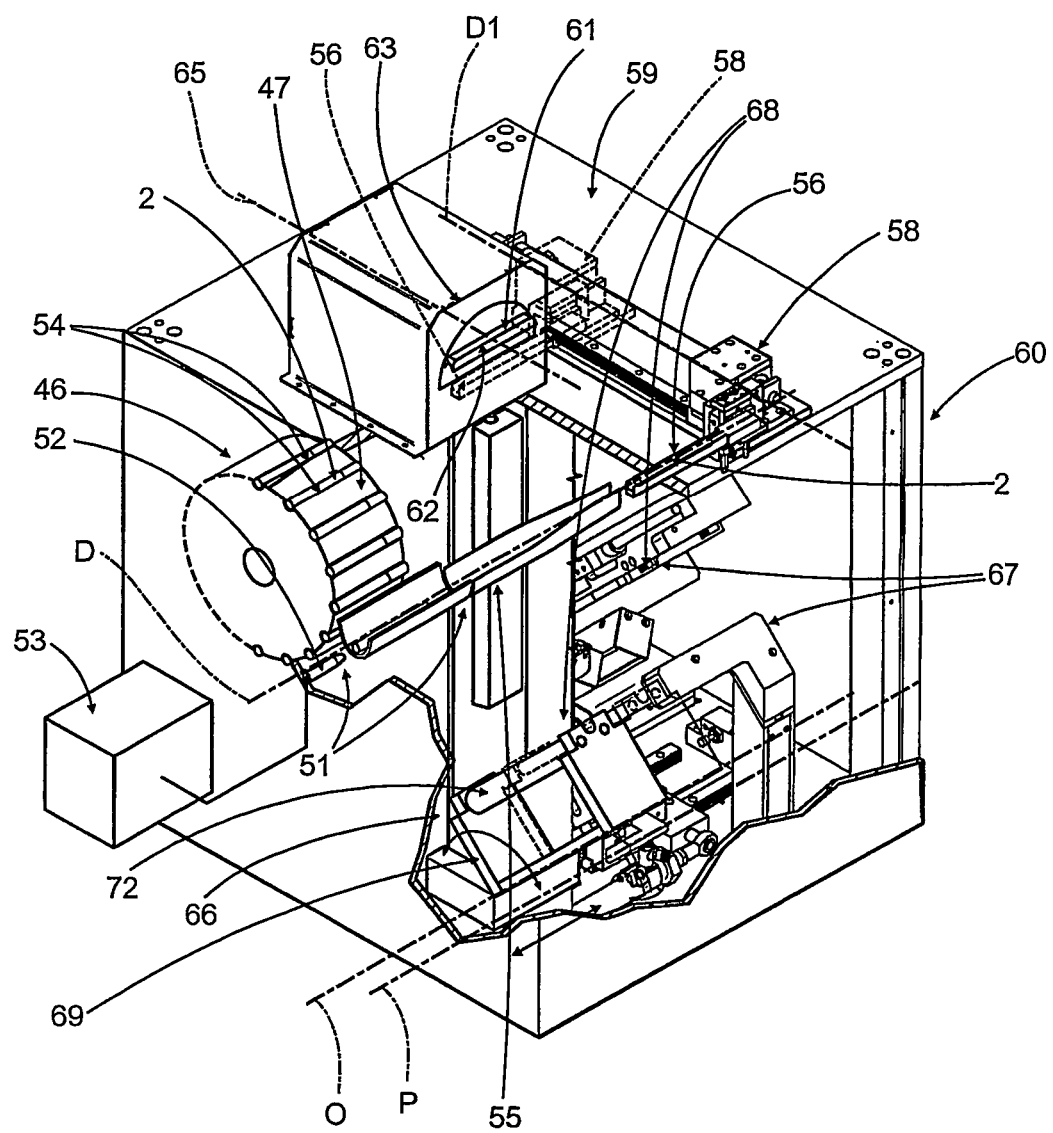
FIG. 2 shows an enlarged detail of the system in FIG. 1, illustrated schematically and viewed in perspective.

With reference also to FIG. 2, the auxiliary inspection unit 45 is connected to the line 1 by way of the sampling device 46, which comprises a diverter device 51 designed, when activated, to deliver a jet from a nozzle 52 connecting with a source 53 of compressed air, such as will eject a single cigarette 2 from a corresponding groove 54 of the outfeed roller 47. The sampling device 46 further comprises a conveyor device 55, pneumatic for instance, positioned to receive the ejected cigarette 2 and advance it along a direction D parallel with its own axis toward take-up means consisting in a first arm 56 equipped with suction means (not illustrated) and forming part of the auxiliary inspection unit 45.

Advantageously, the auxiliary inspection unit 45 in the example illustrated is designed to run a full check on certain key characteristics of the cigarette 2, and more exactly the quality of the outer cylindrical surface and the integrity of the filler at one or both ends of the cigarette 2.

The take-up arm 56 referred to above is aligned along the aforementioned conveying direction D and carried by a slide 58 mounted to a table 59 forming part of a frame 60 by which the unit 45 is housed. The slide 58 is capable of movement thus along a relative direction D1 transverse to the conveying direction D, between a first position of alignment with the conveyor device 55, in which the single cigarettes 2 are received, and a second position shown by phantom lines in FIG. 2, in which the cigarette is released to a second arm 61 equipped with suction means (not indicated) and forming part of transfer means denoted 62 in their entirety.

The transfer means 62 comprise a rotary transfer mechanism denoted 63, carrying the second arm 61 and positioned so as to interact with a vertical channel 64 affording feed means down which the single cigarettes 2 are directed.

As discernible in FIG. 3, the rotary transfer mechanism 63 serves to flip the single cigarette 2, causing it to pivot about an axis 65 parallel to the transverse direction D1 mentioned above, and assume an upright position of alignment with the vertical channel 64.

When the suction means associated with the second arm 61 are deactivated, the cigarette 2 proceeds down the channel 64 toward a retaining and transfer unit 66 that combines with sensing and inspection means 67, illustrated in FIGS. 2 and 4, to create a detection apparatus denoted 68 in its entirety.

As illustrated in FIGS. 2 to 5, the retaining and transfer unit 66 comprises a support member 69 equipped with a frame 70 and, mounted to the frame, rolling means 71 comprising a pair of power driven rollers 72 rotatable about parallel axes in the same direction and combining to create a seat 73 such as will accommodate a single cigarette 2.

The support member 69 is mounted so as to pivot on a horizontal axis O in such a way that the pair of rollers 72, and therefore the seat 73, can be moved from the position indicated in FIG. 3 in which a cigarette 2 is received, to the position indicated in FIGS. 2 and 4, in which the seat 73 is inclined.

Accordingly, the cigarette 2 can be positioned appropriately in preparation for the action of the sensing and inspection means 67, in front of which it will be transferred by a movement of the support member 69 along a predetermined path P parallel to the horizontal axis O.

Figure 5:
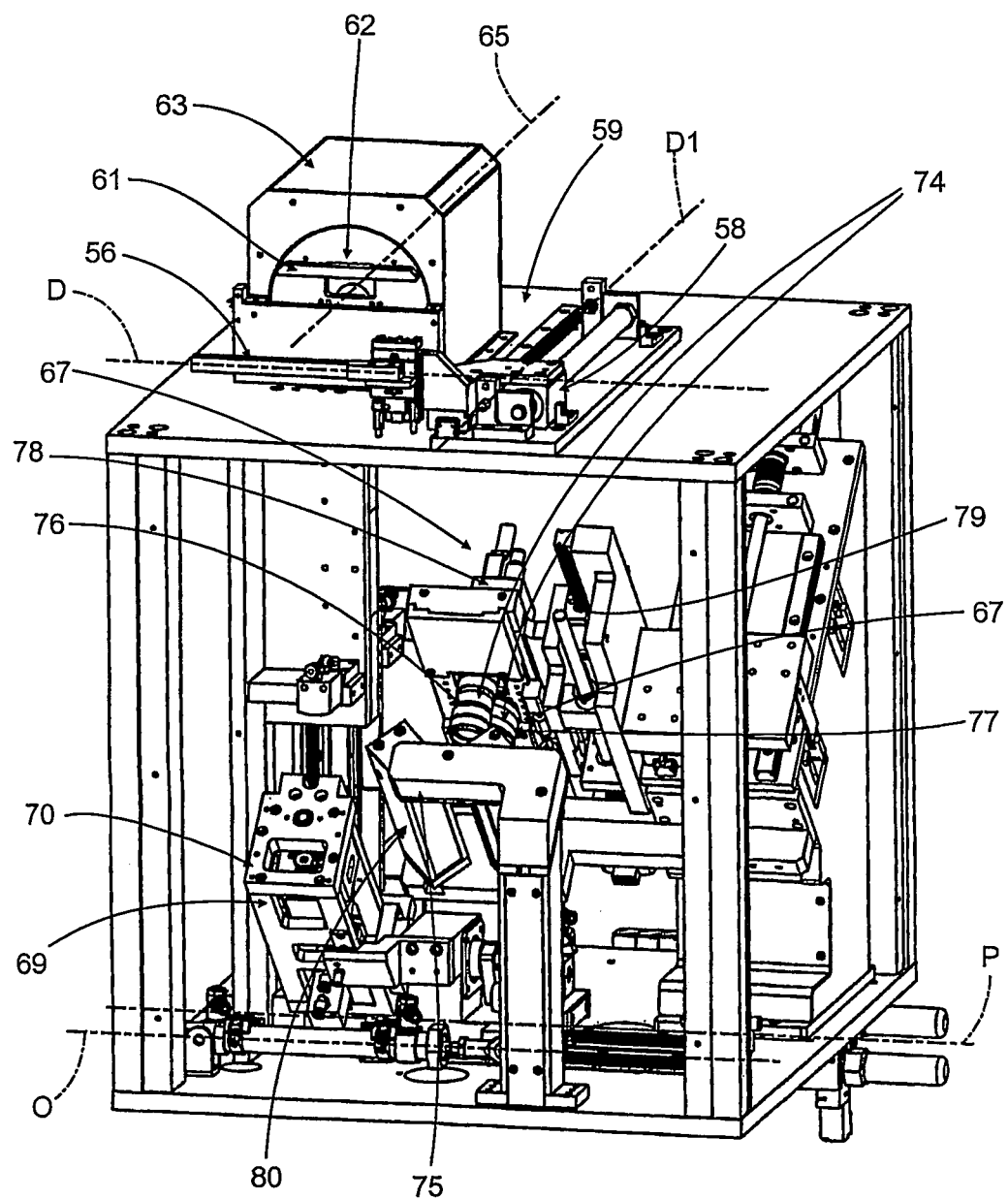
FIG. 5 shows the detail of FIG. 2 from a different standpoint, illustrated schematically and viewed in perspective.

As illustrated in FIGS. 4 and 5, the sensing and inspection means 67 comprise optical means 74 serving to inspect the entire surface of each cigarette 2, caused to rotate on its axis by the pair of rollers 72.

Also forming part of the sensing and inspection means 67 is at least one optical sensor 75 serving to verify that the end of the cigarette 2 is filled properly with tobacco.

The optical means 74 comprise a first television camera or lens 76 equipped with a relative optical assembly, capable of inspecting the entire outer surface of the cigarette 2, and a second television camera or lens 77 equipped with a relative optical assembly, capable of stepping motion along the axis of the pair of rollers 72 and designed to inspect predetermined portions of the outer surface of each cigarette 2.

Referring to FIG. 5, the two cameras 76 and 77 are supported by a carriage 78 capable of movement, generated by an actuator not illustrated, along slide ways 79. A lamp 80 provides the illumination required to enable the optical inspection.

The cigarettes 2 are taken up at the outfeed 39 of the filter tip attachment machine 4 and directed into the auxiliary inspection unit 45 either in response to instructions entered in manual mode by the operator, or alternatively at predetermined intervals in automatic mode, in such a way as to implement a sample quality control.

It will be seen that the signals generated as a result of the quality testing steps performed by the auxiliary inspection unit 45 are relayed by the unit 45 to processing and control units associated with each of the production devices and/or units installed along the manufacturing line 1.

Certain of these processing and control units are denoted 81 in FIG. 1.

Observing the example illustrated, in particular, the signals reflecting the characteristics of the outer surface or ends of the sampled cigarettes 2 will naturally be relayed to the processing and control units 81 associated with the devices or units on which the characteristics in question depend, and thus able to bring about a correction of these same characteristics when necessary.

In the event, for example, that the inspection unit 45 should detect a malfunction of the printer device 16, or the unit 34 by which the tipping papers 35 are cut and fed, or the laser perforating device 43, the signals indicating the faults in question will be routed back to the processing and control units 81 associated with these same devices and units, in such a manner that the appropriate corrective action can be applied.

Accordingly, the auxiliary inspection unit 45 provides a feedback control for all the production devices or units operating on the manufacturing line 1, and the signals emitted by the unit 45 can be presented not only to the network 48, but also to the master control units governing each of the machines in the line 1.

Observing FIG. 1, it will be seen that the master control unit of the cigarette maker 3 is shown as a block denoted 82, and that of the filter tip attachment machine 4 as a block denoted 83.

Finally, the feedback signals can be presented, again via the network 48, to one or more visual display means 84 comprising video screens 85.

Figure 6:
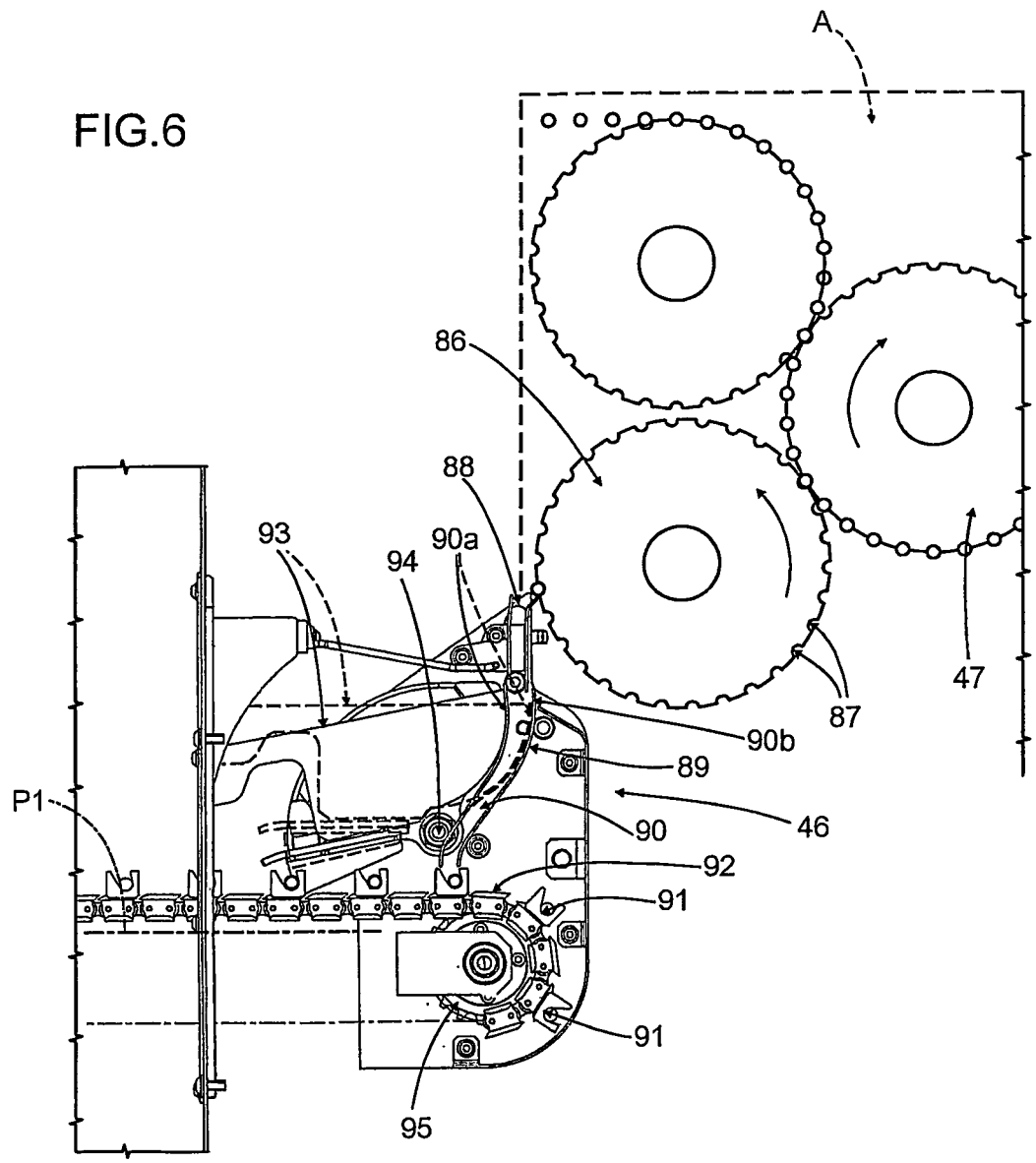
FIG. 6 shows the detail of FIG. 2 in a second embodiment, illustrated schematically and viewed in elevation.
Figure 7:
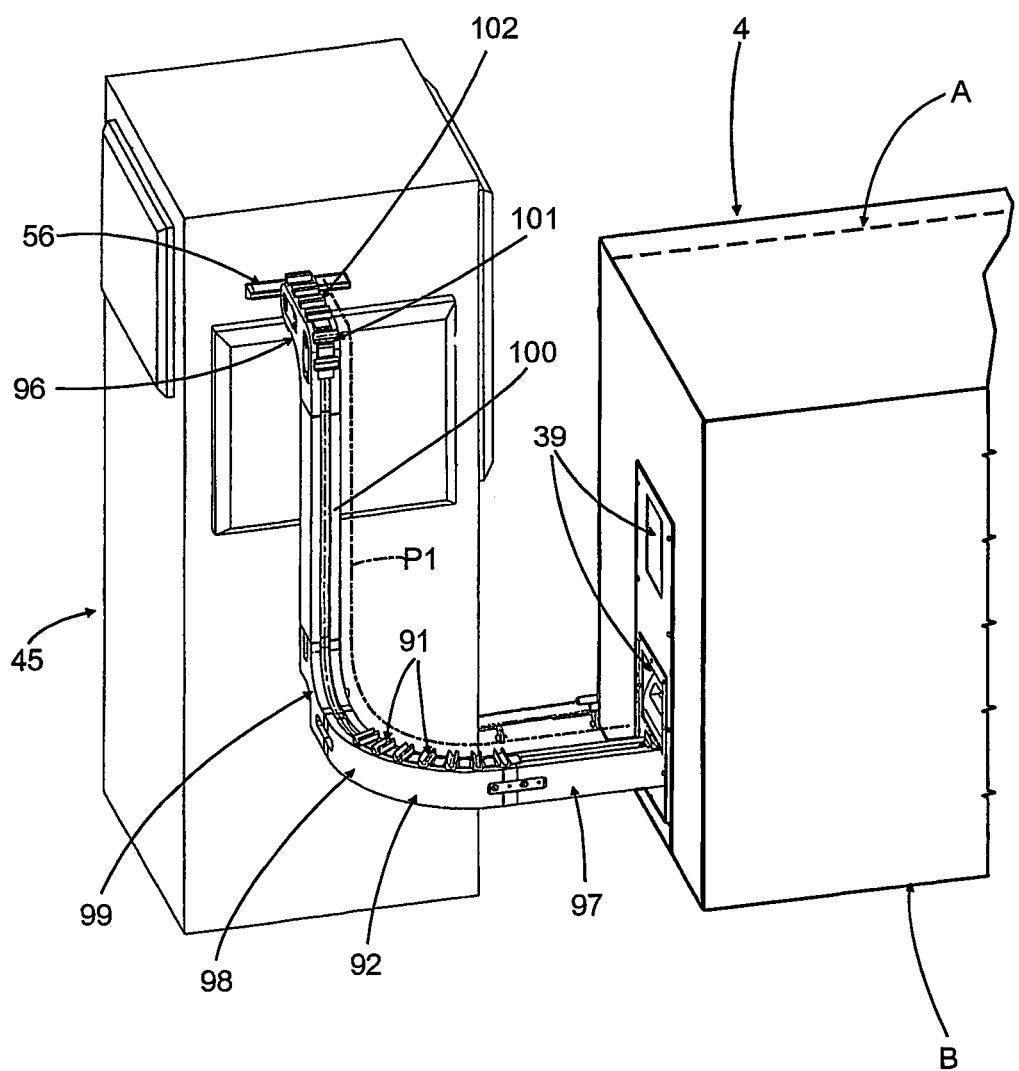
FIG. 7 shows a final portion of the detail in FIG. 6, illustrated schematically and viewed in perspective.

Referring to FIGS. 6 and 7, which relate to a second embodiment of the sampling device 46, the device in question comprises a conveying take-up roller 86 rotating substantially tangential to the outfeed roller 47 of the filter tip attachment machine 4 and furnished with aspirating grooves 87. The cigarettes 2 for inspection are taken up by the conveying roller 86 substantially in the manner disclosed in Italian patent IT 1,220,320, to which reference may be made for a full description. The cigarettes 2 are removed from the grooves 87 by extractor means 88 operating in conjunction with the roller 86, and directed to the entry point of shifter means 89 that can be made to assume two different positions, either automatically or when selected by an operator.

More precisely, in a first, or open position, shown by continuous lines in FIG. 6, the shifter means 89 establish a channel 90 created between two walls 90, denoted 90a on the left and 90b on the right as seen in the drawing, by which cigarettes 2 are fed to the pockets 91 of a pocket conveyor 92, typically intermittent in operation, extending between the outlet end of the channel 90 and the first arm 56 of the auxiliary inspection unit 45.

As illustrated in FIG. 6, the channel 90 can also occupy a second or closed position, shown by phantom lines, assumed when the top end of the one wall 90a is made by actuator means (not indicated) to enter into contact with the top end of the other wall 90b.

In this situation, a tray 93 serving to collect the cigarettes 2, supported by a shaft pivotable about a fulcrum denoted 94, is caused to rotate on this same fulcrum and to shift clockwise as viewed in FIG. 6, thereby passing from a position of disengagement to a receiving position beneath the aforementioned extractor means 88, in which it can take up the cigarettes 2 coming off the roller 86.

The bottom end of the channel 90 will be seen to present a substantially "S" shaped profile, serving to attenuate the speed at which the cigarettes 2 drop into the pockets 91 and prevent the selfsame cigarettes 2 from becoming incorrectly positioned.

Referring to FIG. 7, the pocket conveyor 92 is looped around two pulleys of which a first is shown in FIG. 6 and denoted 95, whilst the second will be located above the first arm 56 of the auxiliary inspection unit 45.

The conveyor 92 extends along a predetermined path P1 of which at least one leg follows a line substantially transverse to the bulkhead A of the filter tip attachment machine 4.

More exactly, the conveyor 92 presents a first leg 97 extending horizontal and parallel to the vertical bulkhead A, followed by curved second and third legs 98 and 99 connected to a vertical fourth leg 100 of which the top end is connected in turn to a curved fifth leg 101, connecting with a final horizontal leg 102.

Passing along the final horizontal leg 102, the pockets 91 of the conveyor 90 are positioned with their axes parallel to the aforementioned arm 56, so that the cigarettes 2 can be transferred to the arm advancing in a direction substantially parallel to the direction D1 along which the arm 56 itself is set in motion.

As discernible also in FIG. 7, the auxiliary inspection unit 45 is located outside the area occupied by the manufacturing line 1, and the cigarettes 2 are released to the receiving arm 56 without any mechanical or pneumatic stress being applied.

The invention claimed is:

1. A system for monitoring and controlling a line manufacturing tobacco products, comprising:
a plurality of production devices and units connected by a common interface network to at least one of a respective master control unit and a visual display;
an auxiliary inspection unit associated with the manufacturing line and connected to the network, for receiving tobacco products from at least one of the production devices and units as test samples, for verifying at least one characteristic of the tobacco products taken as test samples and transmitting signals indicative of the at least one characteristic to the network;
wherein the auxiliary inspection unit comprises a transferring mechanism for transferring the tobacco products, connected to the manufacturing line by a sampling device for sampling products for testing purposes;
wherein the sampling device comprises a conveyor having single pockets, each for containing a tobacco product;
wherein the sampling device comprises a shifter mechanism, interposed between an outfeed roller of the filter tip attachment machine and the conveyor, and movable between a first position and a second position in which a feed channel directing products onto the conveyor is opened and closed, respectively;
a processing and control unit associated with each production device and unit, each processing and control unit connected to the network for receiving the signals as prompts for corrective action; the auxiliary inspection unit thereby forming a feedback control loop with all of the processing and control units such that a corrective action can be applied to each production device and unit on which the at least one characteristic depends.

2. A system as in claim 1, wherein the auxiliary inspection unit comprises a detection apparatus capable in real time of verifying the characteristic of the product and relaying a signal indicative of the characteristic to at least one of the production devices or units.

3. A system as in claim 2, wherein the signal indicative of the characteristic is relayed by the auxiliary inspection unit to the visual display as a source of information.

4. A system as in claim 1, wherein the auxiliary inspection unit comprises a relative signal processing and routing unit connected to the common interface network and to the master control units of the manufacturing line.

5. A system as in claim 1, wherein the manufacturing line comprises a cigarette maker and a filter tip attachment machine.

6. A system as in claim 1, wherein the sampling device is connected to an outfeed of the filter tip attachment machine.

7. A system as in claim 1, wherein the sampling device comprises a conveying take-up roller operating substantially tangential to the outfeed roller, by which products are fed to the shifter mechanism.

8. A system as in claim 7, wherein the sampling device comprises a collection tray into which tobacco products are directed by the shifter mechanism when in the closed position.

9. A system as in claim 1, wherein the conveyor follows a path of which at least one leg extends substantially transverse to a vertical bulkhead of the filter tip attachment machine.

10. A system as in claim 1, wherein the feed channel includes at least one end portion presenting a profile of "S" outline.

11. A system as in claim 1, wherein the conveyor comprises a belt conveyor looped around return pulleys and including an active branch of which the function is to transfer the tobacco products from the outfeed of the filter tip attachment machine to the transfer mechanism.

12. A system as in claim 8, wherein the tray collecting the tobacco products is movable together with the shifter mechanism between a receiving position corresponding to the closed position of the shifter mechanism, in which the tobacco products are collected, and an idle position coinciding with a position in which the shifter mechanism is placed to direct the tobacco products onto the conveyor.

13. A system as in claim 11, wherein the transfer mechanism of the auxiliary inspection unit comprises a receiving mechanism by which single tobacco products are received from the sampling device and a feed mechanism by which the same single products are supplied to the detection apparatus.

14. A system as in claim 13, wherein the detection apparatus comprises a unit by which the single tobacco products are retained and transferred, and also a sensing and inspection system.

15. A system as in claim 14, wherein the retaining and transfer unit comprises a support member capable of movement back and forth along a predetermined path between two limit positions of which one coincides with the outlet of the feed mechanism, where a single tobacco product is picked up, and the other coincides with the sensing and inspection system.

16. A system as in claim 15, wherein the support member is pivotable about an axis parallel to the predetermined path between two limit positions.

17. A system as in claim 14, wherein the retaining and transfer unit comprises a rolling mechanism for rolling the tobacco products.

18. A system as in claim 17, wherein the rolling mechanism comprises a pair of rollers placed orthogonally to the predetermined path, rotatable about parallel axes in the same direction and affording a seat such as will accommodate a single tobacco product.

19. A system as in claim 15, wherein the sensing and inspection system comprises an optical system by which to inspect an entire outer surface of the single tobacco product.

20. A system as in claim 15, wherein the sensing and inspection system comprises at least one optical sensor serving to inspect an end portion of the single tobacco product.

21. A system as in claim 19, wherein the optical system comprises a first television camera equipped with a relative optical assembly, extending along the rollers and serving to inspect the entire outer surface of the single tobacco product, also a second television camera equipped with a relative optical assembly, capable of stepping motion along the rollers and designed to inspect predetermined portions of the outer surface of the single tobacco product.

22. A system as in claim 17, wherein the retaining and transfer unit of the auxiliary inspection unit is connected in parallel to the manufacturing line.

23. A system as in claim 13, wherein the receiving mechanism comprises a first arm carried by a slide capable of translational movement between a position coinciding with the outfeed of the sampling device and a position of release to a second arm movable in a rotary manner to direct the single tobacco products along a vertical channel connecting at the outfeed end with the retaining and transfer unit.

\* \* \* \* \*